UNITED STATES PATENT OFFICE.

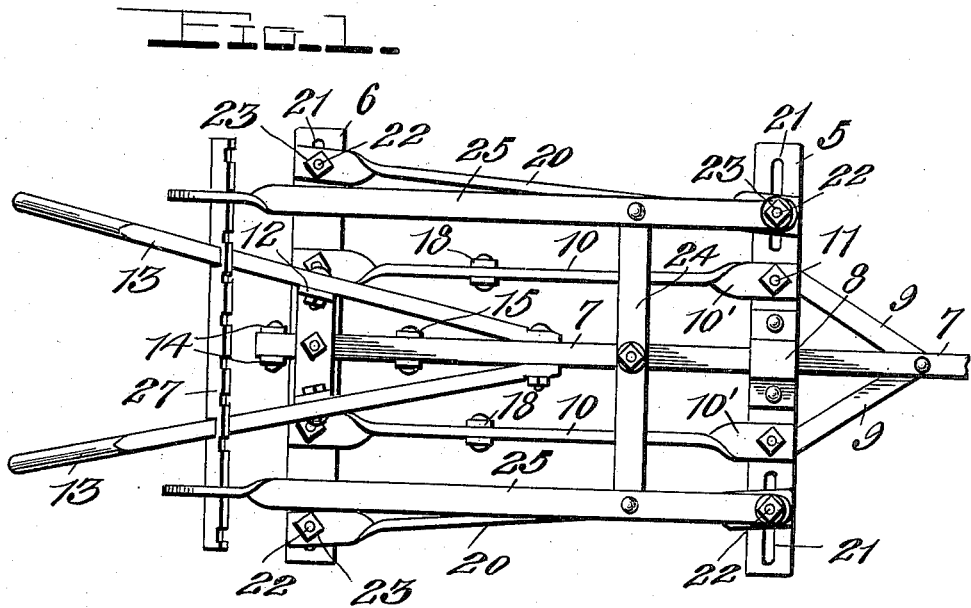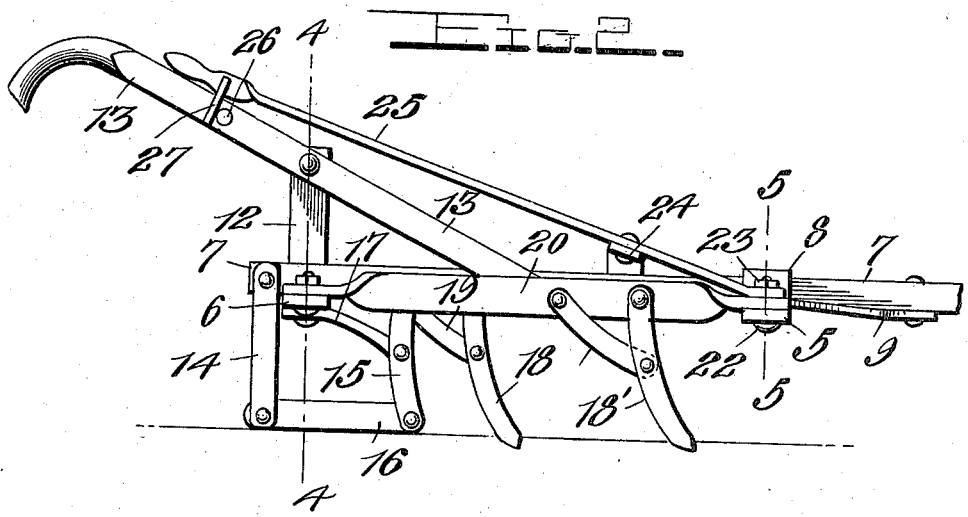

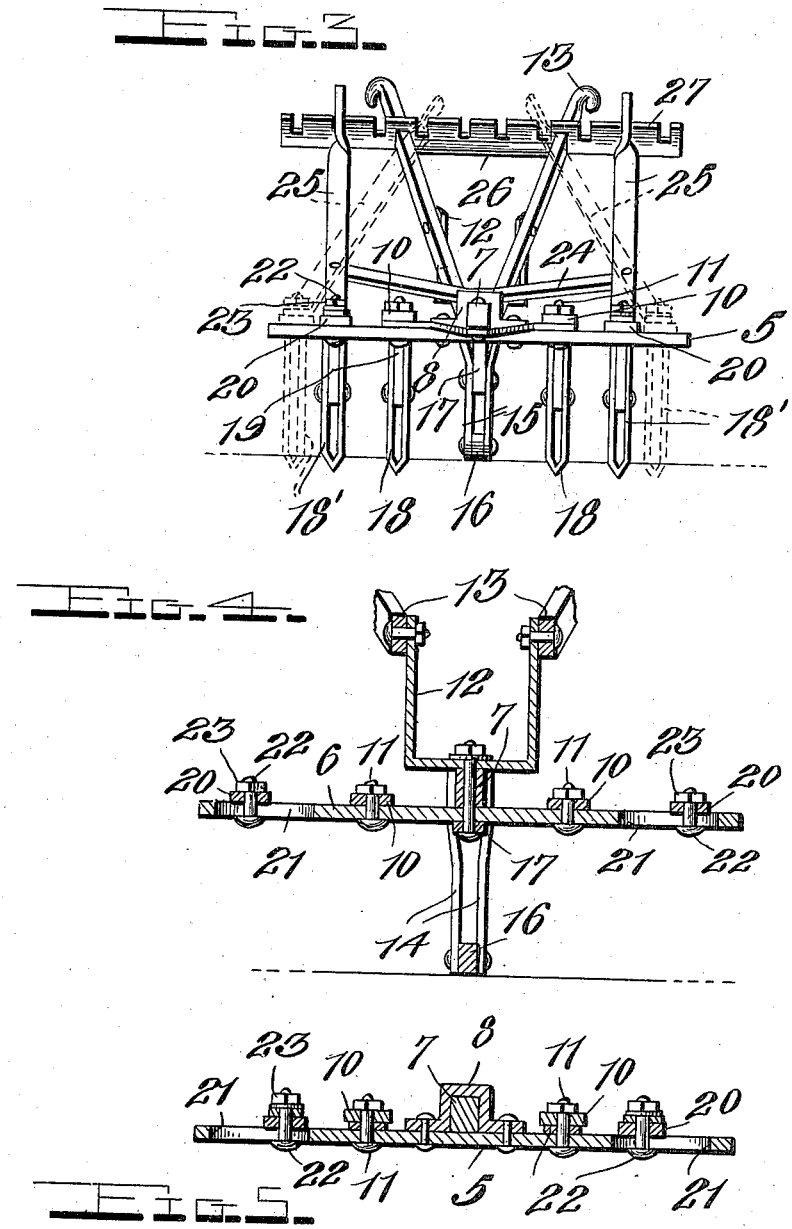

ROBERT W. WISE, OF MALLORY, SOUTH CAROLINA.

CULTIVATOR.

984,174.          Specification of Letters Patent.          Patented Feb. 14, 1911.

Application filed July 25, 1910. Serial No. 573,739.

*To all whom it may concern:*

Be it known that I, ROBERT W. WISE, a citizen of the United States, residing at Mallory, in the county of Dillon and State of South Carolina, have invented certain new and useful Improvements in Cultivators, of which the following is a specification, reference being had to the accompanying drawings.

This invention relates to improvements in cultivators and has for its object to provide a very simple machine of this character having a plurality of stationary cultivating shovels and a plurality of movable shovels whereby the position of the shovels with respect to each other may be regulated in accordance with the width of the plant rows.

Another object of the invention is to provide a machine of this character which is strong and durable in construction and may be utilized for the breaking up of land before planting or for cultivating the plants at different periods of their growth.

A still further object resides in the provision of means for easily and quickly adjusting the movable cultivating shovels and holding the same in their adjusted positions.

With these and other objects in view, the invention consists of the novel features of construction and the combination and arrangement of parts hereinafter fully described and claimed, and illustrated in the accompanying drawings, in which—

Figure 1 is a top plan view of a machine constructed in accordance with my invention; Fig. 2 is a side elevation thereof; Fig. 3 is a front end elevation, the movable cultivating feet being shown in an adjusted position in dotted lines; Fig. 4 is a section taken on the line 4—4 of Fig. 2; and Fig. 5 is a section taken on the line 5—5 of Fig. 2.

Referring more particularly to the drawings 5 and 6 indicate the front and rear transverse frame bars to which are secured the central bar 7. A bearing plate 8 extends over this bar and secures the same to the front transverse bar 5. Diagonal braces 9 also connect the forward end of the bars 5 and 7. The usual draft attachments are connected to the bar 7 to which the draft animals are attached. The bars 5 and 6 are also secured together upon each side of the central bar 7 by the longitudinal bars 10, the intermediate portions of which are disposed in a vertical plane, the ends of said bars being twisted, as shown at 10', and secured to the front and rear bars by means of the bolts 11. A vertically disposed U-shaped plate 12 is secured to the rear end of the center bar 7 and to this plate and the center bar the handles 13 are secured. These handles are of the usual form and extend rearwardly to be grasped by the operator whereby the machine may be guided in its movement. Parallel plates 14 are secured to the rear end of the center bar 7 and depend therefrom and a second pair of depending plates 15 are also secured to said bar in spaced relation to the plates 14. The last named plates are forwardly curved at their rear ends. Between the lower ends of these plates the ends of a runner or shoe 16 are secured. The plates 15 are braced intermediate of their ends by means of the bar 17 secured to said plates and to the rear transverse bar 6.

At a point substantially intermediate of the ends of the longitudinal bars 10, the cultivator feet 18 are secured. Diagonal braces 19 are secured to these feet between their ends and to the bars 10, thereby providing a very strong and rigid construction. It will be obvious that if desired a greater number of these cultivating feet may be provided. The runner or shoe 17 is adapted to support the machine in its movement over the ground and take the strain off of the operator so that he only has to guide the machine transversely during its movement. Movable bars 20 also connect the front and rear bars 5 and 6 adjacent to their ends. These bars carry the cultivator feet 18', and by moving the bars, as will be later described, the cultivator feet 18' may be positioned with relation to the feet 18 carried by the stationary longitudinal bars 10. These cultivator feet are adapted to be disposed upon opposite sides of the plant rows, the runner or shoe 17 being disposed centrally between the rows. Thus, the soil may be disturbed close to the roots of the plants or at a distance therefrom as may be desired under varying conditions. This result is secured in the following manner: The ends of the front and rear transverse bars 5 and 6 are longitudinally slotted, as shown at 21, and the ends of the movable bars 20 which are of similar form to the bars 10 are provided with the bolts 22 which are disposed through the slots 21 and provided with heads on their lower ends. Upon the upper ends of these bolts nuts 23 are threaded. The rear ends of the movable bars 20 are adapted to be adjusted upon the transverse bar 6, the nuts 23 being threaded upon the bolts to securely clamp said rods together. The forward ends of the longitudinal rods are, however, movable transversely upon the front bar 5, the bolts 22 moving in the slots 21 of said bar. A transverse plate 24 is centrally secured upon the central longitudinal bar 7 and is bent at an obtuse angle from its center to dispose its extremities above the plane of said bar. Upon the ends of this transverse plate, the adjusting levers 25 are pivoted, said levers being also secured to the forward ends of the movable bars 20 by means of the bolts 23. A cross bar 26 is secured to the diverging handles and upon this cross bar a notched plate 27 is secured, the ends of said plate extending beyond the handles. The adjusting levers 25 are movable over the edge of the plate and are adapted to be disposed in any one of the notches therein whereby the handles are held against accidental movement.

From the foregoing it is believed that the construction and operation of my invention will be readily understood. The machine is comparatively simple and by adjusting the movable cultivating feet with relation to the stationary feet, the best results in the cultivation of corn and other agricultural products at different periods of their growth may be secured. When using the machine for breaking up ground before planting, the bars 20 may be rigidly secured against movement by adjusting the nuts 23. All parts entering into the construction of the machine may be easily and quickly made, thus reducing the cost of manufacture to a minimum. While I have shown and described the invention as applied to a walking cultivator, it will be understood that the same is also adaptable to a sulky plow or cultivator or any other well known form of such machines. The device is further susceptible of a great many minor modifications which will be obvious to those skilled in the art, such changes being anticipated by the appended claim.

Having thus described the invention what is claimed is:

In a machine of the character described, the combination of front and rear transverse bars and a central longitudinal bar connecting the same, a stationary cultivator foot carrying bar secured to said transverse bars upon each side of the central connecting bar, said transverse bars being longitudinally slotted at their ends, movable cultivator foot carrying bars adjustable in the slots of the rear transverse bars, bolts extending through the slots of the forward transverse bars and through said movable bars, a transverse plate secured on the central bar, a lever pivoted to each end of said plate, the forward end of said lever being secured to the end of one of the movable bars by the bolt extending through the slot in the transverse bar, the movement of said levers being adapted to position the cultivator feet carried by the movable bars with relation to the cultivator feet carried by the stationary bars, handles secured to the central connecting bar extending rearwardly of the machine, and a notched plate secured to said handles, the notches in said plate being adapted to receive the adjusting levers to secure the movable bars in their adjusted positions.

In testimony whereof I hereunto affix my signature in the presence of two witnesses.

ROBERT W. WISE.

Witnesses:
R. E. HARRELL,
J. V. BULLARD.